United States Patent
Ranganath et al.

(10) Patent No.: US 10,467,457 B2
(45) Date of Patent: Nov. 5, 2019

(54) SYSTEM AND METHOD FOR CAPTURING IMAGES USED IN FACIAL RECOGNITION THROUGH EFFECTIVE USE OF EXPOSURE MANAGEMENT

(71) Applicant: NEC Corporation of America, Irving, TX (US)

(72) Inventors: Krishna Ranganath, Roseville, CA (US); Alvin Yap, Fair Oaks, CA (US); Suresh Subramanian, Gold River, CA (US)

(73) Assignee: NEC Corporation of America, Irving, TX (US)

( * ) Notice: Subject to any disclaimer, the term of this patent is extended or adjusted under 35 U.S.C. 154(b) by 363 days.

(21) Appl. No.: 14/958,295

(22) Filed: Dec. 3, 2015

(65) Prior Publication Data

US 2017/0161550 A1    Jun. 8, 2017

(51) Int. Cl.
| | |
|---|---|
| *G06K 9/00* | (2006.01) |
| *H04N 5/235* | (2006.01) |
| *G06K 9/03* | (2006.01) |
| *H04N 5/232* | (2006.01) |

(52) U.S. Cl.
CPC ..... *G06K 9/00255* (2013.01); *G06K 9/00288* (2013.01); *G06K 9/036* (2013.01); *H04N 5/2353* (2013.01); *H04N 5/2356* (2013.01); *H04N 5/23219* (2013.01)

(58) Field of Classification Search
CPC ............. H04N 5/23219; H04N 5/2353; G06K 9/00288; G06K 9/00255; G06K 9/6202
See application file for complete search history.

(56) References Cited

U.S. PATENT DOCUMENTS

| | | |
|---|---|---|
| 3,657,987 A | 4/1972 | Babcock et al. |
| 7,027,619 B2 | 4/2006 | Pavlidis et al. |
| 7,406,184 B2 | 7/2008 | Wolff et al. |
| 7,542,592 B2 | 6/2009 | Singh et al. |

(Continued)

FOREIGN PATENT DOCUMENTS

| | | |
|---|---|---|
| CN | 102110225 | 6/2011 |
| KR | 101573131 B1 | 11/2015 |
| WO | WO03023695 A1 | 3/2003 |

OTHER PUBLICATIONS

International Search Report and Written Opinion for PCT Application No. PCT/US2016/064560 dated Feb. 27, 2017 (12 pages).

*Primary Examiner* — Obafemi O Sosanya
(74) *Attorney, Agent, or Firm* — Reising Ethington P.C.

(57) ABSTRACT

A system and method for capturing images used in a facial recognition system are provided. The system and method are configured to generate a sequential set of control signals configured to cause a camera to capture a corresponding sequential set of probe images of a face of an individual. Each control signal in the sequential set of control signals is configured to cause the camera to capture a probe image of the sequential set of probe images using a different exposure time. The different exposure times associated with the sequential set of control signals together form a predetermined profile configured to enable capture of a usable image from the sequential set of probe images despite variation in at least one of an amount of light and a skin tone of the face of the individual.

19 Claims, 4 Drawing Sheets

(56) References Cited

U.S. PATENT DOCUMENTS

| | | |
|---|---|---|
| 8,818,034 B2 | 8/2014 | Zhang |
| 9,344,642 B2 | 5/2016 | Niemi et al. |
| 2002/0097145 A1 | 7/2002 | Tumey et al. |
| 2004/0246367 A1* | 12/2004 | Yoshida ................. G01B 11/02 |
| | | 348/370 |
| 2005/0219666 A1 | 10/2005 | Ejima et al. |
| 2007/0189583 A1 | 8/2007 | Shimada et al. |
| 2008/0192129 A1* | 8/2008 | Walker ................. G11B 27/034 |
| | | 348/231.2 |
| 2015/0022675 A1 | 1/2015 | Lord et al. |
| 2016/0065852 A1* | 3/2016 | Tang ................. H04N 5/23248 |
| | | 348/208.1 |

\* cited by examiner

SYSTEM AND METHOD FOR CAPTURING IMAGES USED IN FACIAL RECOGNITION THROUGH EFFECTIVE USE OF EXPOSURE MANAGEMENT

BACKGROUND OF THE INVENTION a. Technical Field

The present disclosure relates to a system and method for capturing images used in facial recognition systems. In particular, the present disclosure relates to a system and method that capture a series of images using different exposure times in accordance with a predetermined profile to generate one or more usable images despite variations in skin tone and/or available light.

b. Background

Biometric technologies are now extensively used to identify and authenticate individuals in a variety of fields such as forensics, immigration control, payment systems, and access control. One biometric technology that is growing in use is facial recognition. In facial recognition systems, a probe image of the face of an individual is captured and then compared to one or more previously obtained gallery images in a gallery database for purposes of identification or authentication. The facial recognition system identifies a face in the probe image, identifies key facial features such as the positions of the eyes (including the iris), nose, ears, mouth, chin and head and creates a facial template. This template is compared against templates for each of the gallery images to generate similarity scores indicative of a potential match.

The effectiveness of facial recognition systems is dependent on, among other things, capturing quality images of an individual's face. Unfortunately, probe and gallery images are generally obtained in an uncontrolled environment with many variables including lighting, shadows, camera characteristics, movement and/or the orientation of an individual, and the age or ethnicity of an individual. For example, the amount of natural or artificial lighting on the face of the individual can vary widely depending on the time of day, weather conditions and the functioning of artificial light sources. The variation in illumination affects image quality. Both low levels of illumination and high levels of illumination (image saturation) obscure facial features used for identification and authentication. An ideal illumination level for facial recognition is between about 600 lux to about 1000 lux. On a dark night, illumination may be as small as a fraction of one lux. On a clear day, bright sunlight can result in illumination on the order of a hundred thousand lux. Even when the amount of light is constant, variations in skin tone can affect image quality. Oily skin or pale skin tones will produce different images relative to dark skin tones and it is therefore difficult to assure quality images for all individuals even when the amount of light does not vary. Poor quality probe or gallery images can result in false positives (i.e., that a match exists between a probe image and a gallery image) or false negatives (i.e., that there is no match between the probe image and any gallery image) and can therefore render facial recognition systems unreliable.

Some facial recognition systems attempt to address image quality by modifying algorithms to account for specific environmental variables. This approach, however, is not generally applicable to systems employing different proprietary face detection algorithms. Other facial recognition systems attempt to address image quality by taking a larger number of images by, for example, processing a short video clip, and identifying the image having the best quality. Although this process can address some environmental variables (e.g., movement of the individual), it fails to address many other variables that may remain substantially constant over a period of time such as the amount of light on the face of the individual or the individual's skin tone.

The inventors herein have recognized a need for a system and method for capturing images used in facial recognition systems that will reduce or eliminate one or more of the above-identified deficiencies and/or provide improved performance.

SUMMARY

The present disclosure relates to a system and method for capturing images used in facial recognition systems. In particular, the present disclosure relates to a system and method that capture a series of images using different exposure time in accordance with a predetermined profile to generate one or more usable images despite variations in skin tone and/or available light. The present disclosure further relates to an article of manufacture in the form of a computer storage medium having a computer program encoded thereon that implements the disclosed method and may be used in the disclosed system.

A system for capturing images for use in a facial recognition system according to one embodiment includes a controller configured to generate a sequential set of control signals configured to cause a camera to capture a corresponding sequential set of probe images of a face of an individual. Each control signal in the sequential set of control signals is configured to cause the camera to capture a probe image of the sequential set of probe images using a different exposure time. The different exposure times associated with the sequential set of control signals together form a predetermined profile configured to enable capture of a usable image from the sequential set of probe images despite variation in at least one of an amount of light and a skin tone of the face of the individual.

A method for capturing images for use in a facial recognition system according to one embodiment includes the step of executing a plurality of program instructions in a controller including instructions for generating a sequential set of control signals configured to cause a camera to capture a corresponding sequential set of probe images of a face of an individual. Each control signal in the sequential set of control signals is configured to cause the camera to capture a probe image of the sequential set of probe images using a different exposure time. The different exposure times associated with the sequential set of control signals together form a predetermined profile configured to enable capture of a usable image from the sequential set of probe images despite variation in at least one of an amount of light and a skin tone of the face of the individual.

An article of manufacture in accordance with one embodiment includes a non-transitory computer storage medium having a computer program encoded thereon that when executed by a controller is used to capture images for use in a facial recognition system. The computer program includes code for generating a sequential set of control signals configured to cause a camera to capture a corresponding sequential set of probe images of a face of an individual. Each control signal in the sequential set of control signals is configured to cause the camera to capture a probe image of the sequential set of probe images using a different exposure time. The different exposure times associated with the sequential set of control signals together form a predetermined profile configured to enable capture of a usable image from the sequential set of probe images despite variation in at least one of an amount of light and a skin tone of the face of the individual.

A system and method for capturing images used in a facial recognition system in accordance with the present invention represents an improvement as compared to conventional systems and methods. The inventive system and method enable capture of usable images despite variations in lighting and skin tone. As a result, the inventive system and method improve the reliability and effectiveness of facial recognition systems.

The foregoing and other aspects, features, details, utilities, and advantages of the present invention will be apparent from reading the following description and claims, and from reviewing the accompanying drawings.

DETAILED DESCRIPTION OF PREFERRED EMBODIMENTS

Figure 1:
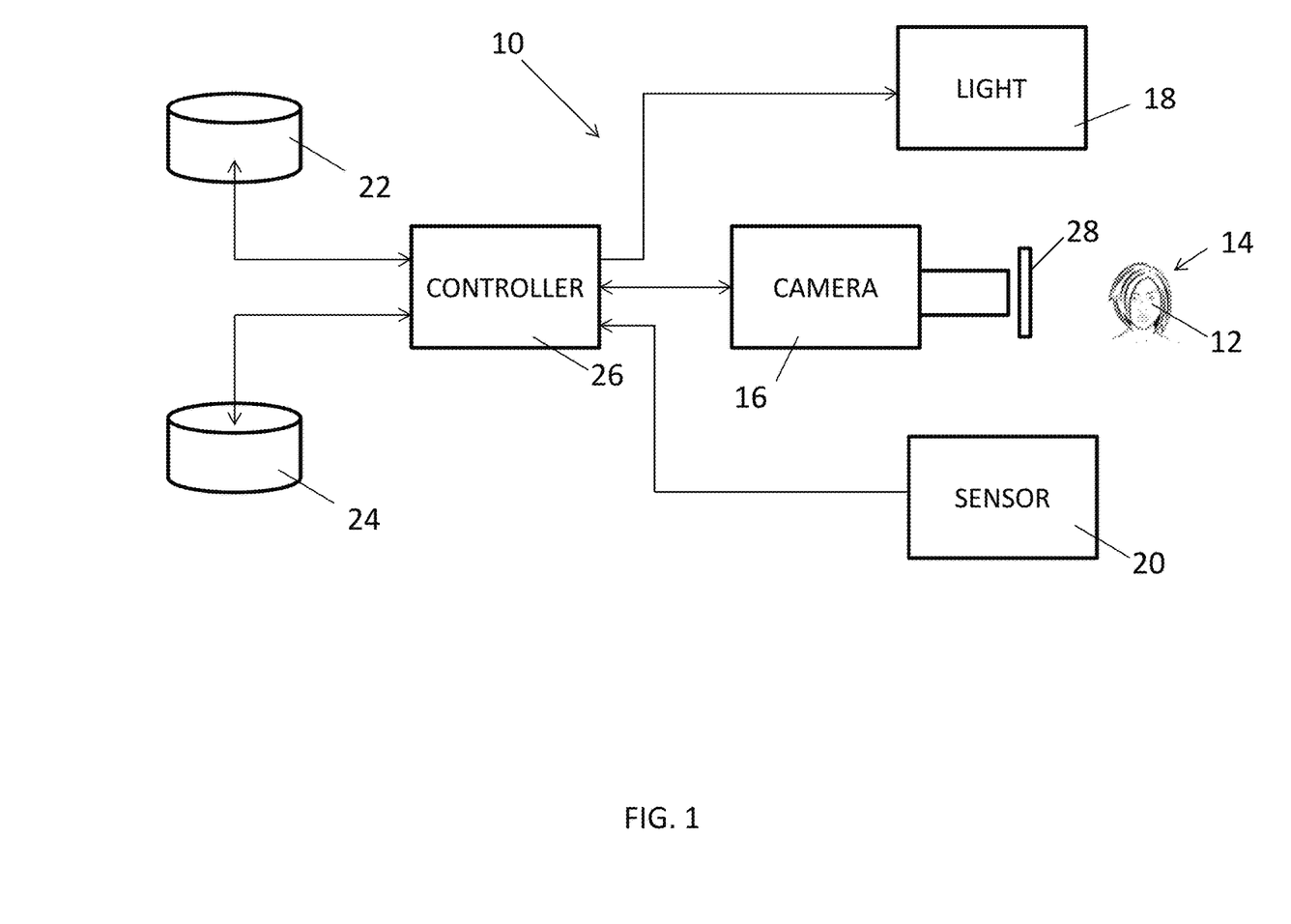
FIG. 1 is a schematic view of a facial recognition system including a system for capturing images for use in the facial recognition system in accordance with one embodiment of the present teachings.

Referring now to the drawings wherein like reference numerals are used to identify identical components in the various views, FIG. 1 illustrates a facial recognition system 10. System 10 is provided for use in identification and/or authentication of individuals based on characteristics associated with a face 12 of an individual 14 and may find use in a wide variety of applications including forensics, immigration control, payment systems, and access control systems. System 10 may include means, such as camera 16, for capturing images of the face 12 of the individual 14 and means, such as light source 18, for controlling the amount of light illuminating the face 12. System 10 may also include means, such as illumination sensor 20, for providing an indication of an amount of natural and/or artificial light on face 12. System 10 may further include a plurality of electronic memory or storage devices, including a device 22 for storing images captured by camera 16 and/or information extracted from those images as well as previously obtained images and/or information extracted from those images and a device 24 for storing information used to configure camera 16. System 10 may also include means, such as controller 26, for controlling camera 16 and comparing images captured by camera 16 to previously obtained images for use in identification or authentication of an individual 14.

Camera 16 provides a means for capturing images of the face 12 of an individual 14. Camera 16 may, for example, comprise a digital camera that can capture color, near-infrared or infrared images and may be configured to capture still images of face 12 or video from which one or more images can be extracted. Camera 16 may include a wide angle lens to allow capture of facial images of individuals of varying height. One or more filters 28 may be disposed in front of the lens of camera 16 and used to limit the amount or type of light impacting the lens of camera 16. Camera 16 and any filters 28 may be supported in a cabinet or housing. In accordance with one aspect of the present teachings, camera 16 is configured by controller 26 to generate a plurality of probe images of the face 12 of an individual 14 using different exposure times in an effort to generate a usable image of the face 12 despite potential variations in at least one of the amount of light on the face 12 of the individual 14 during image capture and the skin tone of individual 14.

Light source 18 provides a means for controlling the amount of light illuminating face 12. Light source 18 may provide artificial light to illuminate the face of the individual in indoor environments or in outdoor environments when natural light is unavailable or limited. Light source 18 may comprise, for example, an incandescent or fluorescent bulb or a light emitting diode (LED) generating light that may be visible or infrared in nature. Light source 18 may be positioned in such a way to minimize reflection of the light generated by light source 18 from eyeglasses or other reflective surfaces on the face 12 of the individual 14. Light source 18 may be operated under the control of controller 26 with the type and amount of light generated by light source 18 responsive to control signals generated by controller 26.

Illumination sensor 20 provides a means for indicating the amount of light illuminating the face 12 of individual 14. Sensor 20 may comprise, for example, a photocell or photoresistor, a photovoltaic sensor, a photo diode or a charge coupled device (CCD). Sensor 20 generates signals indicative of the amount of light in the location or environment in which individual 14 is positioned and, therefore, the amount of light illuminating face 12. This information may be used by controller 26 to control one or more components of system 10 including camera 16 and light source 18. Because a system and method in accordance with the present teachings can account for variation in the amount of light illuminating face 12, various embodiments of the inventive system may not include light source 18 and/or illumination sensor 20. Nevertheless, light source 18 and sensor 20 may still find use in various embodiments of the inventive system and method as described hereinbelow.

Electronic storage devices 22, 24 provide a means for storing images of the faces of individuals and/or information extracted from those images and a means for storing information used to configure camera 16 and other elements of system 10, respectively. Devices 22, 24 may comprise semiconductor memory, optical or magnetic memory or a combination of the foregoing and may include both volatile and non-volatile memory. Devices 22, 24 may define one or more databases or other data structures providing a static or dynamic contact structure for controller 26 and may be used to provide both intermediate information while controller 26 executes programs or instructions and long-term storage of data. A relational database management system (RDBMS) such as the open source system MySQL or a commercial system such as Oracle from Oracle Corp. or SQL Server from Microsoft Corp. may be employed by controller 26 to manage the databases. It should be understood that controller 26 may access devices 22, 24 over a wired or wireless communications network including, for example, a local area network, wide area network, virtual private network, or the public internet and that devices 22, 24 may be located locally or remotely relative to controller 26.

Device 22 may define a gallery database comprising a plurality of gallery images of faces of various individuals including face 12 of individual 14. The gallery images may be organized within the gallery database in a variety of ways. For example, the gallery images may be grouped at one level by the individual whose face is captured in the image and then further grouped at a sublevel based on a value indicative of the quality of the image. The quality value of the image may take into account a variety of factors including the position of the individual, facial expressions of the individual, the presence or absence of obstructive objects (e.g, headwear, glasses, etc.), sharpness and/or resolution of the image, etc. In accordance with one aspect of the present teachings, the quality value may also take into account a level of illumination in the image. The illumination level may be determined by a direct measurement at the time of image capture (e.g., by sensor 20) or may be determined indirectly from illumination values in pixels within the image. Device 22 may also store facial templates extracted from and corresponding to each image with each facial template including information relating to various facial features such as the eyes (including the iris), nose, ears, mouth, chin and head and the relative positions of such features.

Device 24 may include information for configuring system 10 including, for example, the period over which images of the face 12 of individual 14 are captured and the frame rate for camera 16 over that period. In accordance with one aspect of the disclosed system and method discussed in greater detail below, device 24 may also store a plurality of predetermined profiles each defining a sequence of varying exposure times for camera 16 during image capture. Device 24 may also store executable instructions (i.e. software) for controller 16 including instructions for implementing the method described hereinbelow.

Controller 26 provides a means for controlling camera 16. Controller 26 may also provide a means for comparing images captured by camera 16 to previously obtained images for use in identification or authentication of an individual 14. Controller 26 may comprise a programmable microprocessor or microcontroller or may comprise an application specific integrated circuit (ASIC). Controller 26 may include a central processing unit (CPU) and an input/output (I/O) interface through which controller 26 may receive a plurality of input signals including signals generated by camera 16, light sensor 20 and storage devices 22, 24 and generate a plurality of output signals including those used to control camera 16 and light source 18 and store information on devices 22, 24. Although controller 26 is described and illustrated herein as a single unit, it should be understood that separate controllers may be used to perform various processes described herein including control of camera 16 and comparison of images.

Figure 2:
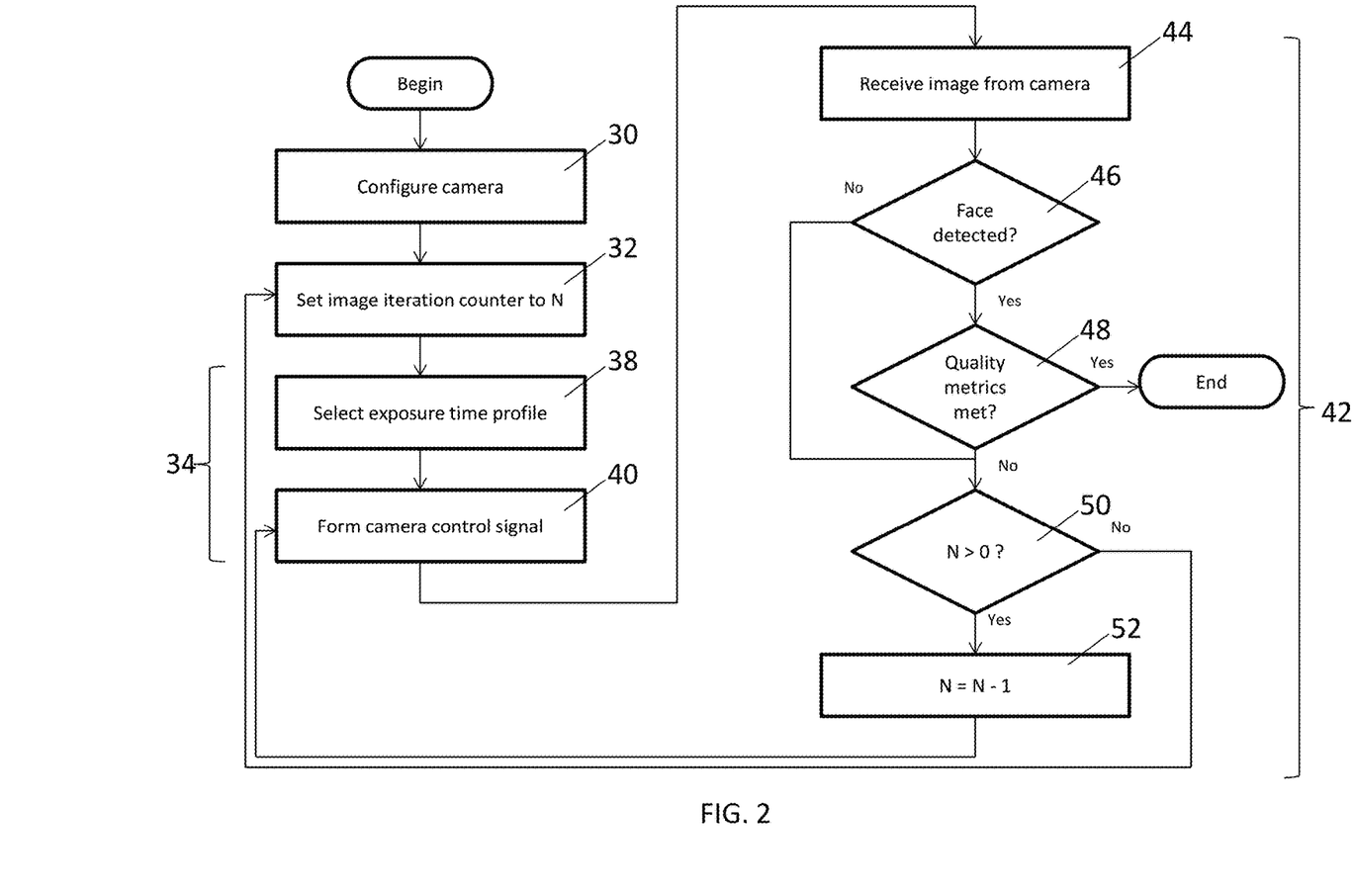
FIG. 2 is a flowchart diagram illustrating a method for capturing images for use in the facial recognition system in accordance with one embodiment of the present teachings.

In accordance with one embodiment, controller 26 is configured with appropriate programming instructions or code (i.e., software) to perform several steps in a method for capturing images for use a facial recognition system such as system 10. The computer program may be stored in memory device 24 and may be uploaded to memory device 24 from a conventional non-transitory computer storage medium having the computer program encoded thereon. Referring now to FIG. 2, the method may begin with the step 30 of configuring camera 16. Controller 26 may be configured to retrieve configuration data from device 24 relating to various operating characteristics of camera 16 including the period of time over which camera 16 will capture images of face 12 of individual 14 and the frame rate for camera 16 over that period.

The method may continue with the step 32 of setting an image iteration counter to a value N indicative of the initial number of images that will be captured by camera 16 of face 12 of individual 14. The counter may be embodied as a location in memory in device 24 and controller 26 may transmit the value N to device 24 for storage in device 24. The value N may be a pre-programmed value, may be derived from the configuration data in step 30, or may be input using conventional input/output devices.

Figure 3:
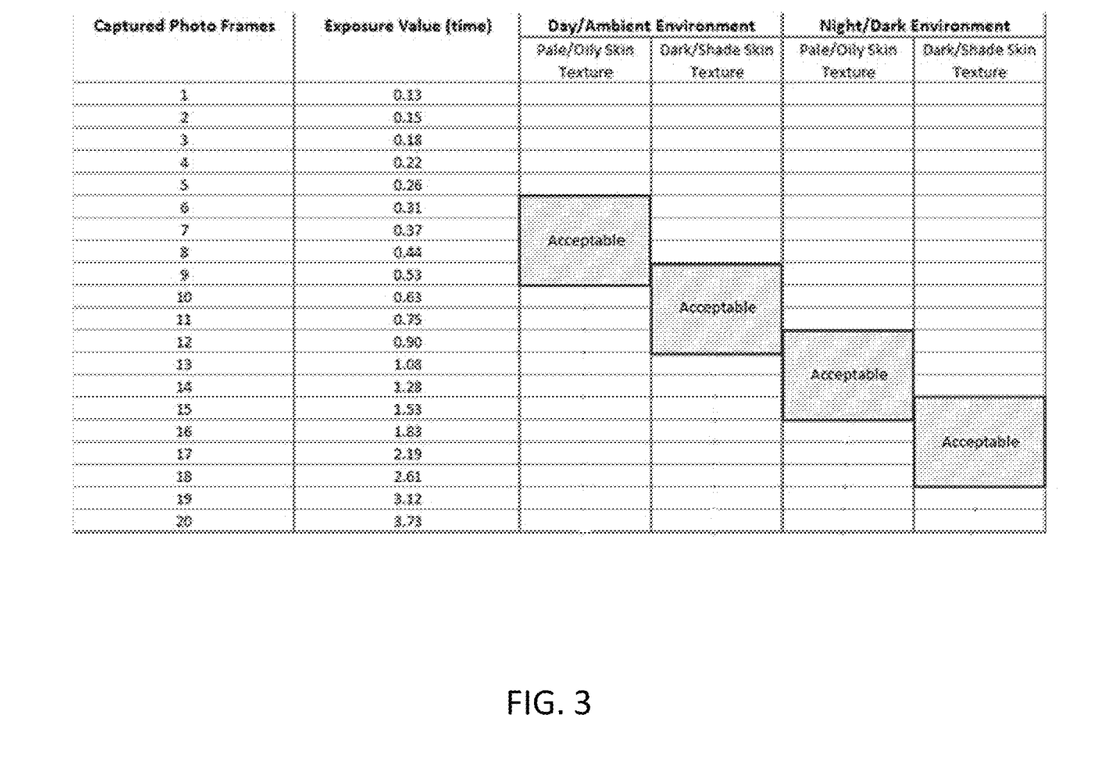
FIG. 3 is a table illustrating acceptability of images based on variations in the amount of light and skin tone together with different image exposure times.

The method may continue with the step 34 of generating a sequential set of control signals that are configured to cause camera 16 to capture a corresponding sequential set of probe images of the face 12 of individual 14. In accordance with one aspect of the present teachings, each control signal is configured to cause camera 16 to capture a corresponding probe image using a different exposure time. The different exposure times associated with the control signals together form a predetermined profile configured to enable capture of a usable image from the sequential set of probe images despite variation in at least one of an amount of light and a skin tone of the face 12 of individual 14. Referring to FIG. 3, a exemplary table is provided in which each row corresponds to one image of a sequence of twenty images or frames taken over a period of time in response to sequentially issued control signals by controller 26. The second column in the table shows an exemplary exposure time for camera 16. The exposure times for each image differ and, in the illustrated embodiment, increase in a non-linear manner. The third and fourth columns reflect conditions when there is a relatively large amount of natural and/or artificial light (e.g., in the afternoon of a sunlit day in an outdoor environment). The fifth and sixth columns reflect conditions when there is a relatively small amount of natural and/or artificial light (e.g., at night in an outdoor environment). The third and fifth columns further reflect a situation where the face 12 of individual 14 has a pale tone and/or oily skin. The fourth and sixth columns further reflect a situation where the face 12 of individual 14 has a dark skin tone or is shaded. As illustrated in the third through sixth columns, by using different exposure times for each image in the set of images, it is possible to obtain one or more usable images for system 10 despite variations in one or both of the amount of light and the skin tone of face 12. As illustrated by comparing columns three and four to columns five and six, when the amount of light on face 12 is relatively high, images captured with a shorter exposure time—wherein less light is captured by camera 16—may be usable images whereas when the amount of light on face 12 is relatively low, images captured with a longer exposure time—wherein more light is captured by camera 16—may be usable images. Similarly, as illustrated by comparing columns three and five to columns four and six, when the skin tone of face 12 is relatively pale or oily, images captured with a short exposure time—wherein less light is captured by camera 16—may be usable images whereas when the skin tone of face 12 is relatively dark of shaded, images captured with a longer exposure time—wherein more light is captured by camera 16—may be usable images. As illustrated in FIG. 3, some images may be acceptable irrespective of the skin tone of face 12 when certain amounts of light are present on face 12 such that some images will be acceptable despite variation in skin tone. Similarly, it is possible that some images may be acceptable under varying light conditions with certain skin tones. It should be understood that the values and acceptable ranges of images in FIG. 3 are intended to be illustrative only and do not necessarily reflect a constructed embodiment or otherwise limit the scope of the present teachings.

Figure 4:
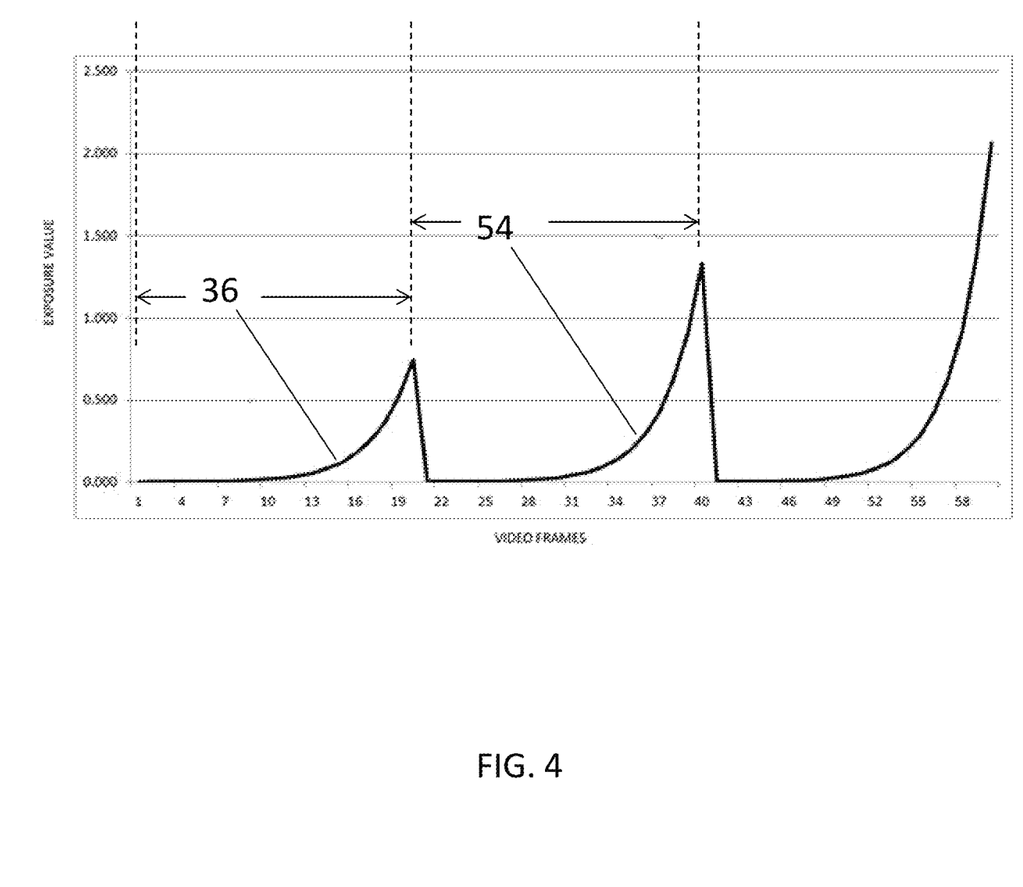
FIG. 4 is a graph illustrating a series of profiles comprised of varying image exposure times used in generating control signals in the system of FIG. 1.

Referring to FIG. 4, the different exposure times associated with the control signals together form a predetermined profile 36. The profile 36 is specifically configured to enable capture of a usable image from the sequential set of probe images despite variation in at least one of an amount of light and a skin tone of the face 12 of individual 14 by varying the exposure times for the captured images. In the embodiment illustrated in FIG. 4 (and in the embodiment illustrated in FIG. 3), the profile 36 is configured in such a way that the exposure time is continuously increasing with the exposure time for each successive image in the sequential set of probe images greater than the exposure time for each preceding image in the sequential set of probe images. Further, in the embodiments illustrated in FIG. 4 (and in the embodiment illustrated in FIG. 3), the profile 36 is configured such that the exposure time increases in a non-linear manner and a difference in exposure times between a first image of the sequential set of probe images and a second image of the sequential set of probe images immediately following the first image differs from a difference in exposure times between the second image and a third image of the sequential set of probe images immediately following the second image. Alternatively, exposure time profiles may be configured such that the exposure time increases in a linear manner and a difference in exposure times between a first image of a sequential set of probe images and a second image of the sequential set of probe images immediately following the first image is equal to a difference in exposure times between the second image and a third image of the sequential set of probe images immediately following the second image. It should be understood that the profiles illustrated in FIG. 4 (and in FIG. 3) are exemplary only and that, for example, profiles could move from longer exposure times to shorter exposure times or assume another form so long as the profile enables the control signals to be configured in such a way that camera 16 employs a different exposure time for each image in the set of images. The exact configuration of the profile including its amplitude and shape/form may be varied in response to a number of factors that are predictive of the amount of light or skin tones. For example, different profiles may be developed based on the location of camera 16 (e.g., whether camera 16 is in an indoor or outdoor environment and whether camera 16 is located in an exposed or shaded area), whether, and what type, of artificial lighting may be present near camera 16 and the time of day that camera 16 is in use. Different profiles may also be developed based on characteristics of the local population of individuals 14 (e.g., if the camera 16 is located in a region of the world where skin tones are typically more pale or more dark).

Referring again to FIG. 2, because varying conditions may make different profiles optimal in enabling capture of a usable image, step 34 may include the substep 38 of selecting a predetermined profile from among a plurality of predetermined profiles having different sequences of exposure times. Various profiles may be stored within electronic storage device 24 and may be retrieved by controller 26 from device 24. Controller 26 may be configured to select one of the profiles based on a pre-programmed instruction and/or in response to inputs to controller 26 indicative of various conditions. For example, controller 26 may select a profile based, in part, on the time of day as indicated by a timer or clock (not shown) in system 10, the amount of available light indicated by illumination sensor 20, or other detected conditions.

Step 32 may further include the substep 40 of forming a control signal for camera 16 based on the selected profile.

Once the profile is selected, controller 26 forms control signals used to control camera 16 in response to the profile and, in particular, to control the exposure time for camera 16 and the resulting image. In accordance with one aspect of the disclosed embodiments, the control signals may be further configured to cause camera 16 to maintain a constant aperture and a constant photosensitivity as the sequential set of images are generated.

The method may continue with the step 42 of determining whether any of the sequential set of probe images comprises a usable image. A usable image is an image that can be used for purposes of identification and/or authentication by a facial recognition system and, therefore, meets at least certain minimum quality requirements. A usable image must, for example, enable a facial recognition system to detect a face in the image. A usable image must also enable a facial recognition system to identify key facial features in the image. It should be understood that the identify and number of facial features will vary depending on the facial recognition algorithm used by the facial recognition system.

In one embodiment, the step of determining whether any of the sequential set of probe images comprises a usable image is performed only after the entire set of probe images is obtained. In this embodiment, the image iteration counter is decreased by one after each control signal is formed. Once an image is captured by camera 16, controller 26 forms another control signal and the cycle repeats until the image iteration counter equals zero and the entire sequential set of probe images has been obtained. At this point, controller 26 begins to evaluate the captured images in the sequential set of probe images to determine whether any of the images comprises a usable image. In this embodiment, controller 26 may evaluate the images in the sequential set of probe images in a predetermined order until a usable image is identified or may evaluate all of the images in the sequential set of probe images to identify all of the usable images or the highest quality usable image among a plurality of usable images.

Referring to FIG. 2, in another embodiment, and in accordance with one aspect of the present teachings, the step 42 of determining whether any of the sequential set of probe images comprises a usable image may be performed iteratively and substantially contemporaneous with step 34. In particular, controller 26 may be configured to evaluate each one of the sequential set of probe images immediately after capture and before generation of another control signal and capture of the next succeeding probe image in the sequential set of probe images in order to determine whether the captured probe image is a usable image. Controller 26 may be further configured to terminate step 34 and the continued generation of the sequential set of control signals if the captured probe image comprises a usable image. In accordance with this aspect of the present teachings, the speed and efficiency of system 10 may be increased.

Step 42 may include several substeps 44, 46, 48, 50, 52. In substep 44, controller 26 receives a probe image of the sequential set of probe images from camera 16. In the case of a video camera, individual images may be extracted from a video using conventional frame capture programs. In substeps 46, 48, controller 26 may use conventional facial recognition algorithms to determine whether a face is present in the probe image and, if so, whether required facial features and present and other facial quality metrics are met. In accordance with one aspect of the present teachings, the quality metrics may include whether the probe image has a proper level of illumination.

If a face is present in the probe image and facial quality metrics are met such that the probe image is a usable image, the process many be terminated and controller 26, or a separate controller, may proceed to use the probe image in various ways. For example, controller 26 may compare the usable probe image to one or more gallery images in a gallery database stored on device 22 and generate a score or other indication of similarity between the probe image and gallery image for use in identification and authentication. In accordance with another aspect of the present teachings, controller 26 may be configured to manage the gallery database by adding usable probe images to the gallery database for future use in identification and authentication. Controller 26 may be further configured to replace existing images in the gallery database with usable probe images obtained using the method in FIG. 2 in order to improve the quality of images in the gallery database. In this case, controller 26 may be configured to compare the captured and usable probe image with images in the gallery database based on various factors (including, for example, illumination levels in the images) and make decisions on whether to maintain or discard gallery images and/or the probe image based on this comparison.

If a face is not detected in the probe image in substep 46 or required facial features are not found in the probe image or other quality metrics are unmet in substep 48, controller 26 may be configured to determine whether all of the sequential set of probe images have been captured and evaluated. Therefore, step 42 may continue with the substep 50 of determining whether image iteration counter meets a predetermined condition relative to a predetermined value. For example, controller 26 may determine whether the image iteration counter is greater than zero. If the image iteration counter is greater than zero, step 42 may continue with the substep 52 wherein controller 26 decrements the image iteration counter by one. After the counter is decremented, the method may return to step 40 to generate the next control signal in the sequential set of control signals.

If the image iteration counter is not greater than zero—thereby indicating that all of the probe images in the sequential set of probe images have been captured and reviewed and no usable image has been obtained—controller 26 may be configured to repeat steps 34, 42 and thereby generate a second set of sequential control signals and corresponding second sequential set of probe images of the face 14 of individual 12 (and, if necessary, additional sets of control signals and probe images). Each control signal in this second sequential set of control signals is again configured to cause camera 16 to capture a probe image of the second sequential set of probe images using a different exposure time.

Referring again to FIG. 4, the different exposure times associated with the second sequential set of control signals together form a second predetermined profile 54 configured to enable capture of a usable image from the second sequential set of probe images despite variation in at least one the amount of light and the skin one of the face 14 of individual 12. In accordance with one aspect of the disclosed embodiments, the second predetermined profile 54 may differ from the first predetermined profile 36 used in generating the first sequential set of probe images. Because a usable image was not obtained using the first predetermined profile, the second predetermined profile may be configured to cause controller 26 to generate a second sequential set of control signals that varies the way in which camera 16 captures the probe images. In particular, the second profile 54 may be configured in such a way that the resulting control signals generated by controller 26 are configured to cause camera 16 to generate probe images using one or more different exposure times relative to the exposure times for the probe images captured using the first profile 36.

In the illustrated embodiment, the first and second predetermined profiles 36, 54 are configured such that the number of control signals generated by controller 26 using profile 36 is equal to the number of control signals generated by controller 26 using profile 54 and, therefore, the number of probe images in the first sequential set of probe images is equal to the number of probe images in the second sequential set of probe images. The profiles 36, 54 are further configured, however, such that the exposure time for one or more images in the second sequential set of probe images differs from the exposure time for one or more corresponding images in the first sequential set of probe images. Profile 54 may further be configured such that the exposure time for each image in the second sequential set of probe images differs from the exposure time for a corresponding image in the first sequential set of probe images. Profile 54 may further be configured such that the exposure time for each probe image in the second sequential set of probe images is greater than the exposure time for a corresponding probe image in the first sequential set of probe images or less than the exposure time for a corresponding probe image in the first sequential set of probe images.

In the illustrated embodiment, profile 54 again results in a continuously increasing exposure time for each successive image in the second set of sequential probe images with the increase being non-linear. Profile 54 is further configured such that the exposure time for at least one of the probe images of the second sequential set of probe images (e.g., the final image) is greater than the exposure time for each probe image of the first sequential set of probe images. Profile 54 is further configured such that the exposure time for at least another one of the probe images of the second sequential set of probe images is greater than a shortest exposure time for any probe image of the first sequential set of probe images but less than a longest exposure time for any probe image of the first sequential set of probe images.

The manner in which the exposure times for the second sequential set of probe images differ from the exposure times for the first sequential set of probe images (e.g., increased exposure times as opposed to decreased exposure times or some combination thereof) may be varied depending on one or more conditions governing selection of the profiles from among the predetermined profiles by controller 26. For example, in accordance with some embodiments, the second predetermined profile may be a pre-programmed selection based on the absence of usable image from the initial sequential set of probe images. In other embodiments, the second predetermined profile may be selected based on detected conditions impacting image capture in the first sequential set of probe images such as the amount of light. These detected conditions may be determined by external sensors such as illumination sensor 20 or from the captured images themselves by controller 26 in analyzing illumination values in the pixels of the first sequential set of probe images.

A system and method in accordance with the invention represents an improvement as compared to systems and methods. In particular, the inventive system and method enable capture of usable images despite variations in lighting and skin tone. As a result, the inventive system and method improve the reliability and effectiveness of facial recognition systems.

While the invention has been shown and described with reference to one or more particular embodiments thereof, it will be understood by those of skill in the art that various changes and modifications can be made without departing from the spirit and scope of the invention.

What is claimed is:

1. An article of manufacture, comprising:
   a non-transitory computer storage medium having a computer program encoded thereon that when executed by a controller is used to capture images for use in a facial recognition system, the computer program including code for:
   generating a first sequential set of control signals configured to cause a camera to capture a corresponding first sequential set of probe images of a face of an individual
   wherein each control signal in the first sequential set of control signals is configured to cause the camera to capture a probe image of the first sequential set of probe images using a different exposure time, the different exposure times associated with the first sequential set of control signals together forming a first predetermined profile configured to enable capture of a usable image from the first sequential set of probe images despite variation in at least one of an amount of light and a skin tone of the face of the individual
   wherein the code for generating the first sequential set of control signals includes code for selecting the first predetermined profile from among a plurality of predetermined profiles, each of the plurality of predetermined profiles having a different sequence of exposure times.

2. The article of manufacture of claim 1 wherein the code for selecting the first predetermined profile includes code for selecting the first predetermined profile responsive to a time.

3. The article of manufacture of claim 1 wherein the exposure time for each successive image in the first sequential set of probe images is greater than the exposure time for each preceding image in the first sequential set of probe images.

4. The article of manufacture of claim 1 wherein a difference in exposure times between a first image of the first sequential set of probe images and a second image of the first sequential set of probe images immediately following the first image is equal to a difference in exposure times between the second image and a third image of the first sequential set of probe images immediately following the second image.

5. The article of manufacture of claim 1 wherein a difference in exposure times between a first image of the first sequential set of probe images and a second image of the first sequential set of probe images immediately following the first image differs from a difference in exposure times between the second image and a third image of the first sequential set of probe images immediately following the second image.

6. The article of manufacture of claim 1 wherein the computer program further includes code for determining whether any of the first sequential set of probe images comprises the usable image.

7. The article of manufacture of claim 6 wherein the code for determining whether any of the first sequential set of probe images comprises the usable image includes code for:
   evaluating each one of the first sequential set of probe images to determine whether the one probe image is the usable image after capture of the one probe image and before capture of a succeeding probe image in the first sequential set of probe images immediately following the one probe image; and,
   terminating generation of the first sequential set of control signals if the one probe images is the usable image.

8. The article of manufacture of claim 7 wherein the computer program further includes code for:
   generating, in the absence of the usable image, a second sequential set of control signals configured to cause the camera to capture a corresponding second sequential set of probe images of the face of the individual
   wherein each control signal in the second sequential set of control signals is configured to cause the camera to capture a probe image of the second sequential set of probe images using a different exposure time, the different exposure times associated with the second sequential set of control signals together forming a second predetermined profile configured to enable capture of the usable image from the second sequential set of probe images despite variation in the at least one of the amount of light and the skin tone of the face of the individual.

9. The article of manufacture of claim 8 wherein a first number of probe images in the first sequential set of probe images is equal to a second number of probe images in the second sequential set of probe images and the exposure time for each probe image in the first sequential set of probe images differs for each corresponding probe image in the second sequential set of images.

10. The article of manufacture of claim 9 wherein the exposure time for each probe image in the second sequential set of probe images is greater than the exposure time for a corresponding probe image in the first sequential set of probe images.

11. The article of manufacture of claim 9 wherein the exposure time for at least one of the probe images of the second sequential set of probe images is greater than the exposure time for each probe image of the first sequential set of probe images.

12. The article of manufacture of claim 1 wherein each control signal in the first sequential set of control signals is further configured to cause the camera to maintain a constant aperture and a constant photosensitivity.

13. A system for capturing images for use in a facial recognition system, comprising:
   a controller configured to
   generate a first sequential set of control signals configured to cause a camera to capture a corresponding first sequential set of probe images of a face of an individual
   wherein each control signal in the first sequential set of control signals is configured to cause the camera to capture a probe image of the first sequential set of probe images using a different exposure time, the different exposure times associated with the first sequential set of control signals together forming a first predetermined profile configured to enable capture of a usable image from the first sequential set of probe images despite variation in at least one of an amount of light and a skin tone of the face of the individual
   wherein the controller is further configured to select the first predetermined profile from among a plurality of predetermined profiles, each of the plurality of predetermined profiles having a different sequence of exposure times.

14. The system of claim 13 wherein a difference in exposure times between a first image of the first sequential set of probe images and a second image of the first sequential set of probe images immediately following the first image differs from a difference in exposure times between the second image and a third image of the first sequential set of probe images immediately following the second image.

15. The system of claim 13 wherein the controller is further configured to determine whether any of the first sequential set of probe images comprises the usable image.

16. The system of claim 15 wherein the controller is further configured, in determining whether any of the first sequential set of probe images comprises the usable image, to:
   evaluate each one of the first sequential set of probe images to determine whether the one probe image is the usable image after capture of the one probe image and before capture of a succeeding probe image in the first sequential set of probe images immediately following the one probe image; and,
   terminate generation of the first sequential set of control signals if the one probe image is the usable image.

17. The system of claim 15 wherein the controller is further configured to:
   generate, in the absence of the usable image, a second sequential set of control signals configured to cause the camera to capture a corresponding second sequential set of probe images of the face of the individual
   wherein each control signal in the second sequential set of control signals is configured to cause the camera to capture a probe image of the second sequential set of probe images using a different exposure time, the different exposure times associated with the second sequential set of control signals together forming a second predetermined profile configured to enable capture of the usable image from the second sequential set of probe images despite variation in the at least one of the amount of light and the skin tone of the face of the individual.

18. The system of claim 17 wherein a first number of probe images in the first sequential set of probe images is equal to a second number of probe images in the second sequential set of probe images and the exposure time for each probe image in the first sequential set of probe images differs for each corresponding probe image in the second sequential set of images.

19. A method for capturing images for use in a facial recognition system, comprising the steps of:
   executing a plurality of program instructions in a controller including instructions for generating a first sequential set of control signals configured to cause a camera to capture a corresponding first sequential set of probe images of a face of an individual
   wherein each control signal in the first sequential set of control signals is configured to cause the camera to capture a probe image of the first sequential set of probe images using a different exposure time, the different exposure times associated with the first sequential set of control signals together forming a first predetermined profile configured to enable capture of a usable image from the first sequential set of probe images despite variation in at least one of an amount of light and a skin tone of the face of the individual
   wherein the first predetermined profile is selected from among a plurality of predetermined profiles, each of the plurality of predetermined profiles having a different sequence of exposure times.

* * * * *